United States Patent
Herzberg et al.

(10) Patent No.: US 7,050,772 B2
(45) Date of Patent: May 23, 2006

(54) CIRCUIT ARRANGEMENT FOR SWITCHING A MOBILE RADIO TRANSMITTER BETWEEN TWO MODULATION MODES

(75) Inventors: Ralf Herzberg, Tönisvorst (DE); Jörg Nagel, Krefeld (DE)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 10/485,405

(22) PCT Filed: May 2, 2003

(86) PCT No.: PCT/EP03/04624

§ 371 (c)(1),
(2), (4) Date: Jan. 29, 2004

(87) PCT Pub. No.: WO03/101133

PCT Pub. Date: Dec. 4, 2003

(65) Prior Publication Data

US 2004/0180639 A1  Sep. 16, 2004

(30) Foreign Application Priority Data

May 29, 2002  (EP)  ................................. 02011966

(51) Int. Cl.
*H04B 1/04*  (2006.01)
*H04M 1/00*  (2006.01)

(52) U.S. Cl. ................ 455/191.3; 455/126; 455/127.1; 455/127.2; 455/127.4; 455/552.1

(58) Field of Classification Search ................ 455/102, 455/108, 110, 126, 127.4, 552.1

See application file for complete search history.

(56) References Cited

U.S. PATENT DOCUMENTS

| 6,047,168 | A | * | 4/2000 | Carlsson et al. ............ 455/126 |
| 6,853,836 | B1 | * | 2/2005 | Asam et al. ................. 455/126 |
| 6,898,257 | B1 | * | 5/2005 | Fischer et al. .............. 375/376 |

FOREIGN PATENT DOCUMENTS

| DE | 100 56 472 | 5/2002 |
| EP | 1 162 754 | 12/2001 |
| WO | WO 98/00929 | 1/1998 |

OTHER PUBLICATIONS

XP 001061061—Berland et al., "A New Dual Mode GSM/Edge Transceiver using Modulation Loop", Oct. 5, 2000, pp. 399-402.

* cited by examiner

*Primary Examiner*—Curtis Kuntz
*Assistant Examiner*—Michael T. Thier
(74) *Attorney, Agent, or Firm*—Bell, Boyd & Lloyd LLC

(57) ABSTRACT

A circuit is provided for regulating operation of a transmitter of a mobile communication terminal, which runs in the EDGE and GMSK modulation modes. The inventive circuit includes a power amplifier supplying an output signal for an antenna of the mobile communication terminal; a phase regulator that is provided with a phase comparator to which a setpoint signal for the output signal of the power amplifier is fed, and a voltage-controlled oscillator adjusting the phase position of the output signal of the power amplifier, the phase regulator regulating the phase position of the output signal of the power amplifier; an amplitude-regulating device that is provided with an amplitude comparator to which the setpoint signal for the output signal of the power amplifier is fed, and a battery-powered battery-voltage modulator adjusting the amplitude of the output signal of the power amplifier, the amplitude-regulating device regulating the amplitude of the output signal of the power amplifier; and a feedback line feeding an actual measured value for the output signal of the power amplifier back to the phase comparator and the amplitude comparator, the feedback line being provided with an adjustable amplifier which is controlled by a baseband chip and sets an output power of the antenna. The inventive circuit includes a changeover switch which is wired in such a way that it connects an input of the battery-voltage modulator to an output of the amplitude comparator in a first position for the EDGE mode while connecting an input of the battery-voltage modulator to an output of the power amplifier in a second position for the GMSK mode, the connection being made via the adjustable amplifier in both positions.

5 Claims, 1 Drawing Sheet

CIRCUIT ARRANGEMENT FOR SWITCHING A MOBILE RADIO TRANSMITTER BETWEEN TWO MODULATION MODES

BACKGROUND OF THE INVENTION

The present invention relates to a circuit for controlling operation of a transmitter in a mobile communication terminal, which transmitter is designed for the modulation modes EDGE and GMSK, having:

a power amplifier which delivers an output signal for an antenna on the mobile communication terminal;

a phase controller, which has a phase comparator, to which a nominal signal for the output signal from the power amplifier is supplied, and a voltage controlled oscillator for aligning the phase of the output signal from the power amplifier, for controlling the phase of the output signal from the power amplifier;

an amplitude controller, which has an amplitude comparator, to which the nominal signal for the output signal from the power amplifier is supplied, and a battery voltage modulator, powered by a battery, for aligning the amplitude of the output signal from the power amplifier, for controlling the amplitude of the output signal from the power amplifier; and a feedback line for feeding back a present measured value for the output signal from the power amplifier to the phase comparator and to the amplitude comparator, which feedback line has an adjustable amplifier, controlled by a baseband chip using a control signal, for setting an output power for the antenna. Such a circuit is used in the prior art both for the modulation mode EDGE and for the modulation mode GMSK, with the circuit being invariable with regard to such modulation modes. The way in which the known circuit works is explained below with reference to FIG. 2. It will be emphasized in this regard that a transmitter equipped with such a circuit is referred to, generally, as a "polar loop transmitter."

As will be seen in FIG. 2, a nominal voltage signal $U_s$ is supplied both to an input on a phase comparator 1 and to an input on an amplitude comparator 2. Respective second inputs on the phase comparator 1 and on the amplitude comparator 2 have an output voltage $U_a$ applied to them, specifically with the interposition of an adjustable amplifier 4 which determines an attenuation for the output voltage Ua and hence a gain factor $U_a/U_s$ for the amplitude control loop. The attenuation of the controllable amplifier 4 can, thus, be used to set the output power delivered to the antenna.

The adjustable amplifier 4 is controlled by a baseband chip in a mobile communication terminal to which the circuit belongs, with a control signal R applied to the adjustable amplifier 4 being able to be chosen on the basis of a power requirement from a remote station for the mobile communication terminal, such as a base station in a mobile radio network.

An output signal from the phase comparator 1 is supplied to a voltage controlled oscillator 5 whose output signal $U_{in}$ is applied to an input on the power amplifier 3 and aligns the phase of the output signal $U_a$ with the phase of the nominal voltage $U_s$.

An output signal from the amplitude comparator 2, which is typically an integrating error amplifier in practice, is applied to an input on a battery voltage modulator 6 which is powered by a battery $U_{batt}$ or a storage battery in the mobile communication terminal. An output signal from the battery voltage modulator 6 is used for aligning the amplitude of the voltage signal $U_a$ with the amplitude of the nominal signal $U_s$, specifically taking into account the attenuation by the adjustable amplifier 4.

In the circuit shown in FIG. 2, a feedback line runs from the output of the power amplifier 3 for the output voltage $U_a$ via the adjustable amplifier 4 to the respective inputs of the phase comparator 1 and the amplitude comparator 2.

The battery voltage modulator 6 directly influences a supply voltage $U_c$ for the power amplifier 3 and, thus, an envelope for the output voltage signal $U_a$ from the power amplifier 3.

The circuit explained above has no kind of variability for the purpose of optimizing this operation with respect to various modulation modes, such as EDGE and GMSK. These modulation modes are readily known to experts in the field of mobile radio technology. For details, reference is made to the specialist book "Mobilfunknetze und ihre Protokolle 1"[Mobile radio networks and their protocols 1] by B. Walke, third edition, published by Verlag B. G. Teubner, 2001.

The described circuit based on the prior art, which is used for linearizing the power amplifier 3, has the following drawback when used for either the EDGE or GMSK modulation modes: to ensure error-free operation of the transmitter, the power $P_a$ delivered to an antenna 7 by the power amplifier 3, and thus the output voltage $U_a$, must always be below its maximum deliverable output power $P_{max}$. If a drop in the available storage battery voltage causes, by way of example, the maximum deliverable output voltage $U_{max}$ to fall below the value which is to be chosen for the output voltage $U_a$ on the basis of the control, then the amplitude controller reaches its control limit. In this unwanted operating state, control loop instabilities and saturation effects can result in impairment of the switching and modulation spectrum. Timing problems also may arise, since when its control limit has been reached the amplitude comparator requires a certain time in order to leave saturated operation; for example, if the output power $P_a$ needs to be brought down at the end of a transmission time slot. As such, both the appearance and the leaving of the control limit results in unwanted effects in the time profile for the output power $P_a$ as well as in the switching spectrum, where even the prescribed power boundaries for relevant mobile radio standards can be infringed.

To avoid the control limit, appropriate dimensioning of the power amplifier 3 has been used, to date, to provide a sufficiently high reserve for the available output power $P_{max}$. However, this results in high component costs and/or premature disconnection of the mobile communication terminal as a result of faster consumption of the storage battery capacity. The latter drawback can be overcome only by using a larger and more expensive storage battery.

Against this background, the present invention is directed toward a circuit, as cited at the outset, wherein it is economically more efficient for the two modulation modes EDGE and GMSK.

SUMMARY OF THE INVENTION

Such object is achieved for the above-described circuit by virtue of a changeover switch being provided which connects an input on the battery voltage modulator to an output on the amplitude comparator in a first position for the EDGE mode and, in a second position for the GMSK mode, the control signal for the adjustable amplifier is applied directly to the input of the battery voltage modulator.

The effect achieved by using the changeover switch is that the amplitude controller is not used in the transmitter's GMSK mode. Instead, the control signal for the adjustable amplifier is supplied directly to the battery voltage modulator so that it is used as control signal for the battery voltage modulator. In this way, in the GMSK mode, the control limit for the amplitude controller is effectively prevented from being reached. Dispensing with the amplitude control can be accepted because the GMSK modulation mode has no provision for amplitude modulation, but rather only for phase modulation.

The adjustable amplifier can bring about a raising or lowering of the output voltage and, accordingly of the output power from the power amplifier, with the adjustable amplifier's setting needing to be controlled with sufficient accuracy.

Preferably, a second changeover switch is provided which is connected such that it connects the input of the phase comparator to the output of the power amplifier in a first position and to an output of the oscillator in the second position. In this case, it is preferred that the second changeover switch adopt its first position for the EDGE mode, while the second changeover switch adopt its second position for the GMSK mode. The reason for this is that there is amplitude modulation in EDGE mode. Since a phase response in the power amplifier is normally amplitude dependent, the output signal is highly phase distorted. To eliminate this error, the phase error in the output voltage $U_a$ needs to be corrected by the phase controller.

In the GMSK mode, this correction is not necessary. In this case, it is sufficient to return the output signal from the oscillator.

This has the advantage that the phase controller's decoupling from the power amplifier results in it being relatively insensitive to interference signals received by the antenna, wherein otherwise necessary additional measures for suppressing interference signals, such as connectable attenuating elements in a line from the power amplifier to the antenna, can be dispensed with.

Another advantage of the present invention is that the battery voltage modulator already provided in the prior art is used as an actuating element for the output power from the power amplifier. By providing the two changeover switches, it is possible, without any further complexity in terms of components as compared with the known circuit arrangement, to choose a respectively optimized transmitter mode for the two modulation modes GMSK and EDGE.

Additional features and advantages of the present invention are described in, and will be apparent from, the following Detailed Description of the Invention and the Figures.

DETAILED DESCRIPTION OF THE INVENTION

Figure 1:
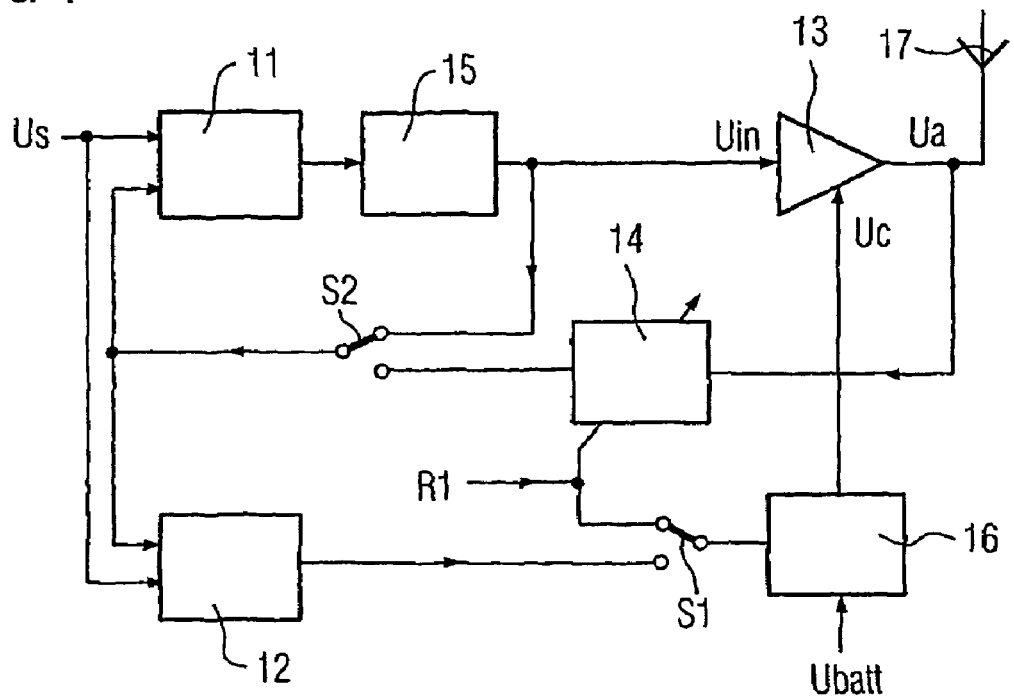
FIG. 1 shows a circuit for a polar loop transmitter which can be switched between an EDGE modulation mode and a GMSK modulation mode.

The inventive circuit contains the same main components as the circuit based on the prior art; namely, a phase comparator 11, an amplitude comparator 12, a power amplifier 13, an adjustable amplifier 14, a voltage controlled oscillator 15, a battery voltage modulator 16 and an antenna 17.

Both the phase comparator 11 and the amplitude comparator 12 are supplied with a nominal voltage $U_s$ as input signal. In addition, a present measured value for the output voltage $U_a$ from the power amplifier 13 is fundamentally fed back to respective inputs on the phase comparator 11 and on the amplitude comparator 12. In contrast to the prior art, however, the present invention makes provision for a changeover switch S1 which can be switched between a first and a second position.

The position of the switching S1 governs which signal is applied to an input on the battery voltage modulator 16. In GMSK mode, the switch S1 adopts its first position, in which a control signal R1 for the adjustable amplifier 14 is applied directly to an input on the battery voltage modulator 16 by the switch S1, whereby, in this instance of operation, there is no amplitude control for the output signal $U_a$ from the power amplifier 13. Instead, the control signal R1 for the adjustable amplifier 14 acts directly as control signal for the battery voltage modulator 16. In this way, a control limit for the amplitude controller is avoided, since there is no amplitude control in GMSK mode.

Figure 2:
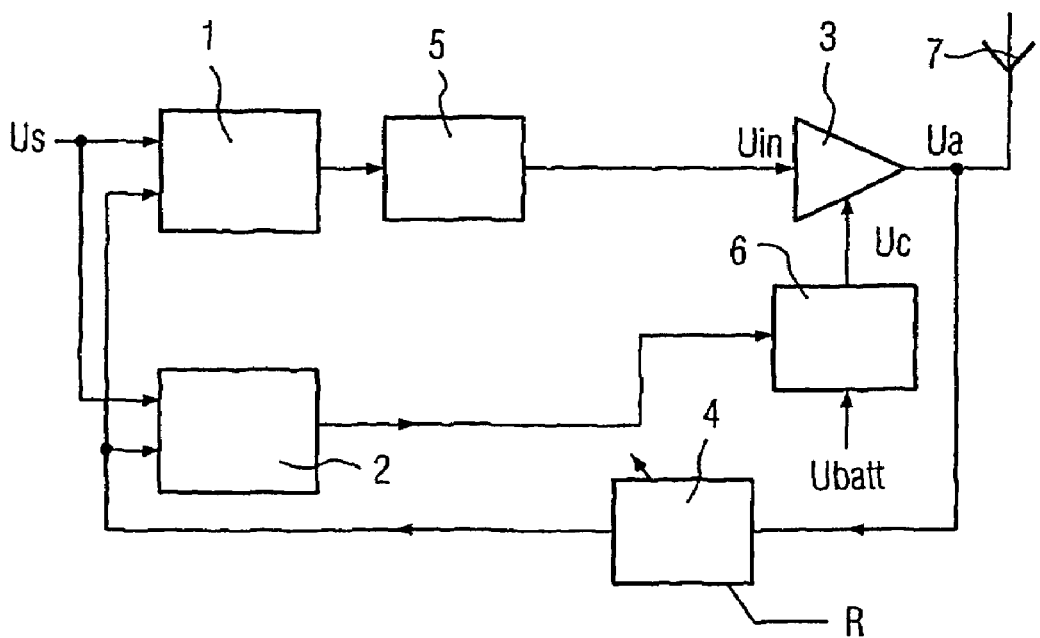
FIG. 2 shows a circuit for a polar loop transmitter based on the prior art.

If the transmitter, which is part of a mobile communication terminal, is operated with the EDGE modulation mode, the switch S1 adopts its second position, in which an output signal from the amplitude comparator 12 is applied directly to the input of the battery voltage modulator 16. In this position of the changeover switch S1, amplitude control is used in the same way as in the circuit shown in FIG. 2, which corresponds to the prior art.

In addition, the circuit shown in FIG. 1 contains a second changeover switch S2, which governs which signal is applied to that input of the phase comparator 11 whose signal value needs to be compared with the nominal voltage signal $U_s$. In the EDGE modulation mode, the changeover switch S2 adopts a first position, in which the output voltage or the output signal from the power amplifier 13 is fed back to the respective inputs of the phase comparator 11 and the amplitude comparator 12, which is an integrating error amplifier, so that control for the phase of the output voltage signal $U_a$ using the voltage controlled oscillator 5 takes place in the same way as in the circuit shown in FIG. 2, which corresponds to the prior art.

By contrast, in the GMSK modulation mode, the changeover switch S2 adopts a second position, in which an output signal from the oscillator 15 is fed back directly to an input on the phase comparator 11, with the signal applied to this input being compared with the voltage nominal signal Us using the phase comparator 1.

In view of the above explanations, it becomes clear that FIG. 1 shows the changeover switches S1 and S2 in such positions as are necessary for operation of the transmitter when a GMSK modulation mode is effective.

In comparison with the circuit based on the prior art, the circuit shown in FIG. 1 likewise has a feedback line which runs from an output on the power amplifier 13 via the adjustable amplifier 14 and the changeover switch S2 to the relevant inputs of the phase comparator 11 and the amplitude comparator 12. The inventive circuit, however, is provided with an additional feedback line which runs from an output on the oscillator 15 to the changeover switch S2. A further additional line, whose path supplies the control signal for the adjustable amplifier (VGA; Variable Gain Amplifier) 14

(EDGE) or the battery voltage modulator 16 (GMSK), runs from the adjustable amplifier 14 to the changeover switch S1.

The advantages of the present invention become particularly clear when the output powers stipulated in respective standards for GMSK and EDGE are considered. The maximum output power for GMSK is +33 dBm. The relevant value for the EDGE modulation mode is +30 $dBm_{PEP}$. In this regard, a multimode appliance, which is provided for both GMSK mode and for EDGE mode, already has an output power reserve of 3 dB for EDGE mode, which is normally sufficient for error-free operation of the transmitter in EDGE mode.

An even higher reserve for the GMSK mode is now avoided by virtue of the changeover switch S1 being provided, whereby the battery voltage modulator 16 is actuated directly by an output signal from the adjustable amplifier 14. The transmitter's output power can be set simply by controlling the battery voltage modulator 16 with sufficient accuracy.

Although the present invention has been described with reference to specific embodiments, those of skill in the art will recognize that changes may be made thereto without departing from the spirit and scope of the present invention as set forth in the hereafter appended claims.

The invention claimed is:

1. A circuit for controlling operation of a transmitter in a mobile communication terminal, the transmitter being designed for both EDGE and GMSK modulation modes, the circuit comprising:
   a power amplifier for delivering an output signal, via an output of the power amplifier, for an antenna on the mobile communication terminal;
   a phase controller for controlling a phase of the output signal from the power amplifier, wherein the phase controller includes a phase comparator with an input to which a nominal signal for the output signal from the power amplifier is supplied, and further including a voltage controlled oscillator for aligning the phase of the output signal from the power amplifier;
   an amplitude controller for controlling an amplitude of the output signal from the power amplifier, wherein the amplitude controller includes an amplitude comparator to which the nominal signal for the output signal from the power amplifier is supplied, and further including a battery voltage modulator, powered by a battery, for aligning the amplitude of the output signal from the power amplifier;
   a feedback line for feeding back a present measured value for the output signal from the power amplifier to both the phase comparator and the amplitude comparator, wherein the feedback line includes an adjustable amplifier, controlled by a baseband chip using a control signal, for setting an output power for the antenna; and
   a changeover switch for connecting an output on the amplitude comparator to an input on the battery voltage modulator in a first position for the EDGE modulation mode, and for connecting the control signal for the adjustable amplifier directly to the input of the battery voltage modulator in a second position for the GMSK modulation mode.

2. A circuit for controlling operation of a transmitter in a mobile communication terminal as claimed in claim 1, wherein the adjustable amplifier raises and lowers the amplitude of the output signal from the power amplifier.

3. A circuit for controlling operation of a transmitter in a mobile communication terminal as claimed in claim 1, further comprising a second changeover switch for connecting the output of the power amplifier to the input of the phase comparator in a first position, and for connecting an output of the voltage controlled oscillator to the input of the phase comparator in a second position.

4. A circuit for controlling operation of a transmitter in a mobile communication terminal as claimed in claim 3, wherein the second changeover switch is in the first position for the EDGE modulation mode.

5. A circuit for controlling operation of a transmitter in a mobile communication terminal as claimed in claim 3, wherein the second changeover switch is in the second position for the GMSK modulation mode.

* * * * *